(12) United States Patent
Wheat et al.

(10) Patent No.: US 6,434,876 B1
(45) Date of Patent: Aug. 20, 2002

(54) METHOD OF APPLYING A PARTICLE-EMBEDDED COATING TO A SUBSTRATE

(75) Inventors: Gary Eugene Wheat, Madisonville; Terri Kay Brown, Central City, both of KY (US); Roger Dale Wustman, Loveland, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/670,187

(22) Filed: Sep. 26, 2000

(51) Int. Cl.$^7$ ................................................. B05D 1/36
(52) U.S. Cl. ..................... 42/203; 427/205; 427/250; 427/253; 427/255.7
(58) Field of Search ........................ 427/250, 252, 427/255.38, 255.394, 255.7, 203, 205, 253

(56) References Cited

U.S. PATENT DOCUMENTS 3,914,507 A * 10/1975 Fustukian .................... 427/214
5,385,760 A * 1/1995 Schassberger et al. ....... 427/305
5,476,363 A * 12/1995 Freling et al. ............... 427/448
5,665,217 A * 9/1997 Gruver et al. ............... 427/282
5,985,467 A * 11/1999 Beele ........................ 427/255.7

* cited by examiner

Primary Examiner—Bret Chen
(74) Attorney, Agent, or Firm—David L. Narciso; Gregory O. Garmong

(57) ABSTRACT

A turbine blade is coated by first applying a particle-entrapped tip coating to the tip of the airfoil. An aluminum-containing coating is thereafter applied to the airfoil, including to the tip of the airfoil overlying the particle-entrapped tip coating. The aluminum-containing coating is applied by providing a source of aluminum contacting the airfoil that deposits aluminum onto the airfoil at a coating temperature, and heating the airfoil to the coating temperature so that the aluminum-containing coating is deposited onto the airfoil, and so that the aluminum-containing coating and the particle-entrapped tip coating are diffused into the turbine blade substrate. The step of applying the aluminum-containing coating occurs without substantial prior interdiffusing of the particle-entrapped tip coating with the tip of the airfoil as a separate step.

17 Claims, 3 Drawing Sheets

METHOD OF APPLYING A PARTICLE-EMBEDDED COATING TO A SUBSTRATE

FIELD OF THE INVENTION

This invention relates to the application of a particle-embedded coating to a substrate and, more particularly, to the application of an abrasive coating to the tip of a gas turbine blade.

BACKGROUND OF THE INVENTION

In an aircraft gas turbine (et) engine, air is drawn into the front of the engine, compressed by a shaft-mounted compressor, and mixed with fuel. The mixture is burned, and the hot exhaust gases are passed through a turbine mounted on the same shaft. The flow of combustion gas turns the turbine by impingement against an airfoil section of the turbine blades and vanes, which turns the shaft and provides power to the compressor. The hot exhaust gases flow from the back of the engine, driving it and the aircraft forwardly.

The turbine blades are mounted on a turbine disk, which rotates on a shaft inside a tunnel defined by a cylindrical structure termed the stationary shroud. The hot combustion gases flow from the engine's combustor and into the tunnel. The hot combustion gases pass through the turbine blade structure and cause it to turn. To achieve a high efficiency, it is important to minimize the leakage of the hot combustion gases around the turbine. However, the sealing of the turbine structure against such leakage presents a problem, because the components of the structure expand and contract differently during the temperature changes of over 2000° F. that are experienced during each cycle of engine operation.

To prevent the leakage of hot combustion gases around the turbine, it is known to size the components so that the tips of the turbine blades extend to a slightly larger diameter than the inside diameter of the shroud, when the engine is operated. Upon initial startup and break-in of the engine, the tips of the turbine blades contact the inside of the shroud, and wear away a path along a circumferential track around the inside surface of the shroud. Further contacting between the blade tips and the stationary shroud sometimes occurs again during operation of the engine in the usual operating conditions or under unusual conditions such as application of emergency power or large loads applied to the components.

In these circumstances, it is desired that material is worn away from the stationary shroud by the turbine blade tips, rather than vice versa. To ensure that the blade tips are more abrasive than the shroud material, it is known to apply a particle-entrapped abrasive coating onto the tips of the turbine blades. The processing of the blade tips to add the [<b>]old0 particle-entrapped coating increases the cost of the manufacture of the turbine blades. Additionally, the existing particle-entrapped abrasive coatings are sometimes lacking in abrasiveness, durability, and service life.

There is accordingly a need for an improved approach to the preparation of abrasive tips on gas turbine blades, and other applications having some of the same requirements. The present invention fulfills this need, and further provides related advantages.

BRIEF SUMMARY OF THE INVENTION

This invention provides an approach for applying particle-embedded coatings to articles such as turbine blades, and articles made by the approach. The present technique produces an improved particle-embedded coating material, and also reduces the process costs of preparing the articles as compared with prior approaches. The present approach is compatible with the other processing used for turbine blades, such as the application of environmental coatings and thermal barrier coatings on the airfoil surface of the turbine blade, and with the use of modified coatings such as platinum aluminides.

A method for coating an article comprises the steps of furnishing an article substrate, thereafter applying a particle-entrapped coating to the article substrate, and thereafter applying an aluminum-containing coating overlying the particle-entrapped coating. The step of applying the aluminum-containing coating includes the steps of providing a source of aluminum contacting the article substrate that deposits aluminum onto the article substrate at a coating temperature, and heating the article substrate to the coating temperature so that an aluminum coating is deposited onto the article substrate overlying the particle-entrapped coating. The aluminum coating and the particle-entrapped coating are interdiffused with the article substrate. The step of applying the aluminum-containing coating occurs without substantial prior interdiffusing of the particle-entrapped coating with the article substrate as a separate step.

In this approach, the step of applying a particle-entrapped coating desirably includes the step of applying a coating comprising boron nitride particles (preferably cubic boron nitride particles) embedded in a matrix comprising nickel. The step of providing a source of aluminum desirably includes the step of providing a gaseous source of aluminum, preferably $AlF_3$. The coating temperature is greater than about 1800° F., preferably from about 1800° F. to about 2000° F., and most preferably from about 1925° F. to about 1975° F.

In another embodiment, a method for coating an article substrate comprises the steps of furnishing an article substrate having a first region and a second region, thereafter applying a particle-entrapped coating to the first region, and thereafter applying an aluminum-containing coating to the first region and to the second region. The step of applying the aluminum-containing coating includes the steps of providing a source of aluminum contacting the article substrate that deposits aluminum onto the article substrate at a coating temperature, and heating the article substrate to the coating temperature so that an aluminum coating is deposited onto the first region and onto the second region, and so that the aluminum coating and the particle-entrapped coating are diffused into the article substrate. The step of applying the aluminum-containing coating occurs without substantial prior interdiffusing of the particle-entrapped coating with the first region as a separate step.

In the application currently of most interest, a method for coating a turbine blade comprises the steps of furnishing a turbine blade substrate having an airfoil and a tip at an end of the airfoil, thereafter applying a particle-entrapped tip coating to the tip of the airfoil, and thereafter applying an aluminum-containing coating to the airfoil, including to the tip of the airfoil overlying the particle-entrapped tip coating as well as the rest of the airfoil. The step of applying the aluminum-containing coating includes the steps of providing a source of aluminum contacting the airfoil that deposits aluminum onto the airfoil at a coating temperature, and heating the airfoil to the coating temperature so that an aluminum coating is deposited onto the airfoil, and so that the aluminum coating and the particle-entrapped tip coating are diffused into the turbine blade substrate. The step of applying the aluminum-containing coating occurs without substantial prior interdiffusing of the particle-entrapped tip coating with the tip of the airfoil as a separate step.

The present approach produces a particle-entrapped coating that has improved performance as compared with conventional particle-entrapped coatings. In the case where the as-deposited particle-entrapped coating is boron nitride particles in a nickel or nickel-alloy matrix, the concurrent interdiffusing of aluminum into the as-deposited particle-entrapped material and the interdiffusing and bonding of the matrix to the substrate produces an altered structure of particles that are more abrasive, harder, more durable, and longer-lived than conventional boron nitride particles. The present approach has the additional advantage that it shortens the processing time and reduces the processing cost of the article by eliminating a separate step of interdiffusing the particle-entrapped coating with the article substrate as a separate step.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
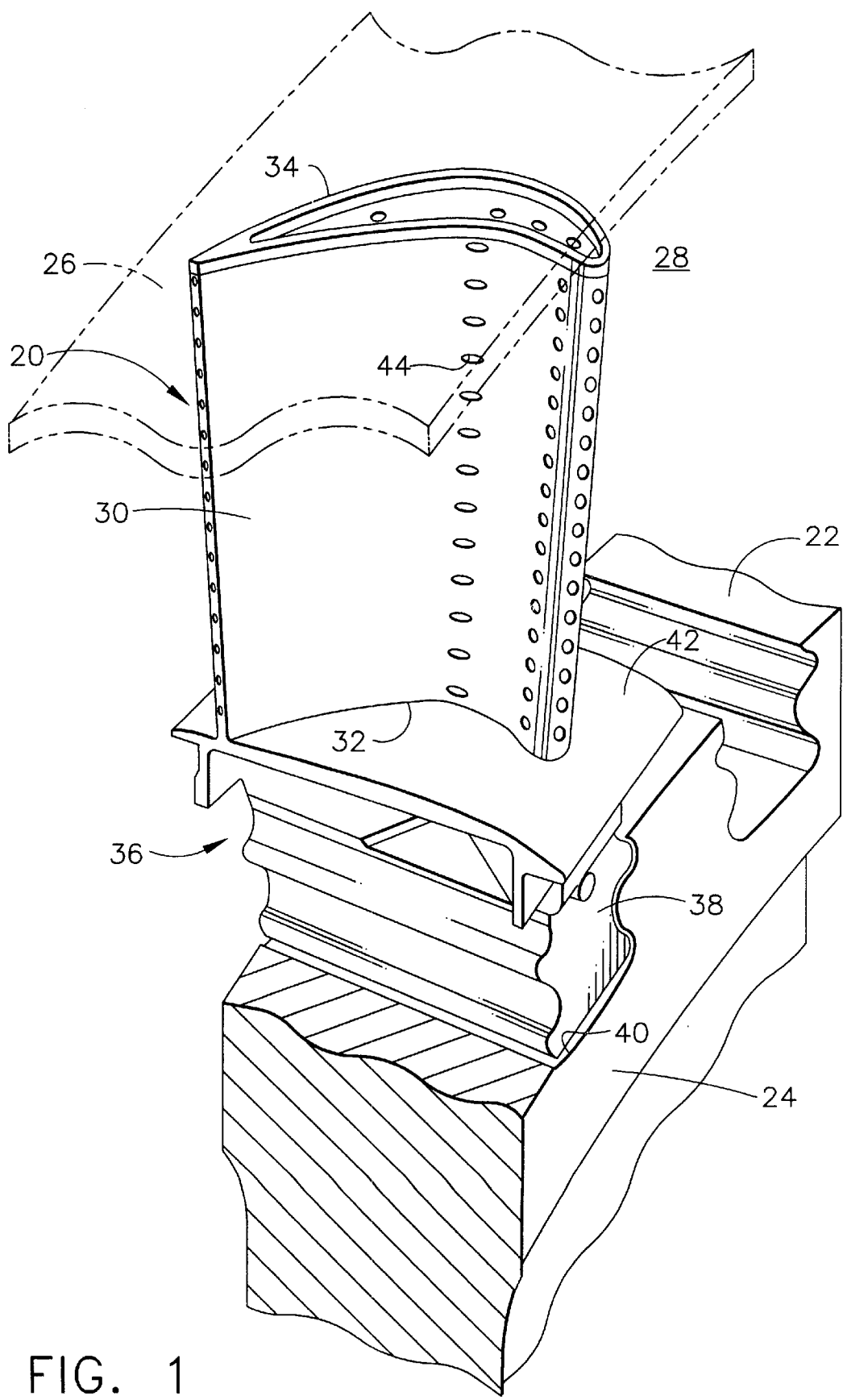
FIG. 1 is a perspective view of a turbine blade positioned adjacent to a portion of a shroud.

FIG. 1 depicts a turbine blade 20 mounted to a periphery 22 of a turbine disk 24. There are a large number of turbine blades 20 mounted to the turbine disk 24, but only one is illustrated. The turbine disk 24 rotates on a turbine shaft (not shown) positioned along its centerline. As the turbine disk 24 rotates, the turbine blade 20 sweeps through an annular volume between the turbine disk 24 and a stationary shroud 26, a portion of the circumference of which is shown in FIG. 1. The shroud 26 in its entirety defines a tunnel 28 in which the turbine disk 24, turbine shaft, and turbine blades 20 rotate.

Figure 2:
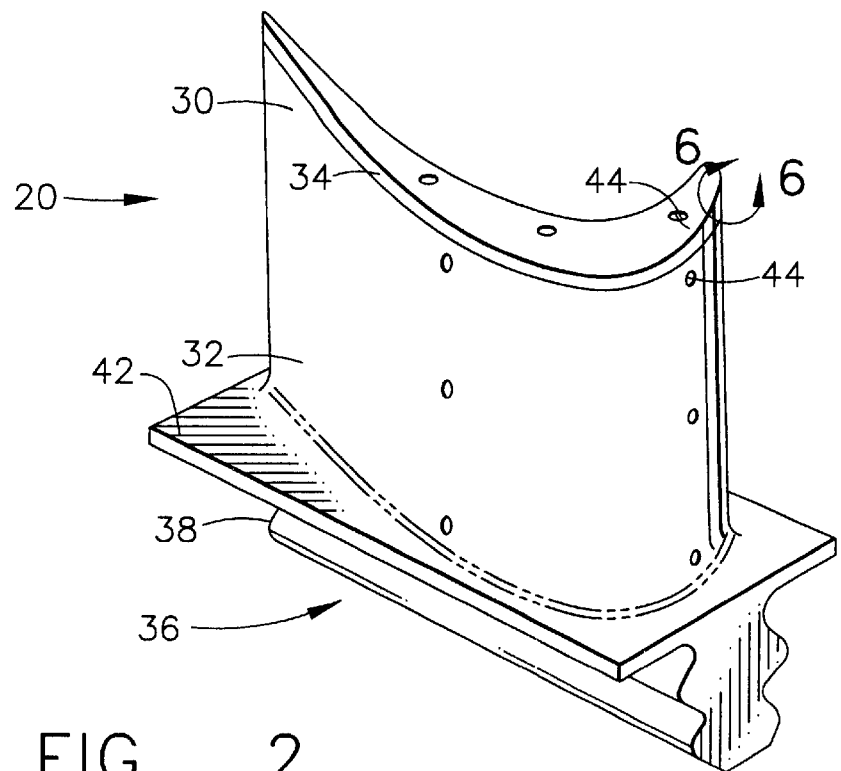
FIG. 2 is a perspective view of a turbine blade.

As shown in FIG. 1 and in greater detail in FIG. 2, the turbine blade 20 includes an airfoil 30 having a root 32 and a tip 34. There is an attachment 36 joined to the root 32 of the airfoil 30. In this case, the attachment 36 is a dovetail 38 which is integral with the airfoil 30, extends downwardly from the airfoil 30, and engages a slot 40 in the turbine disk 24. The attachment 36 may instead be a bonded joint between the turbine blade 20 and the turbine disk 24, or the attachment 36 may be an integral construction (i.e., a BLISK) of the turbine blade 20 and the turbine disk 24. A platform 42 extends laterally outwardly from the area where the airfoil 30 is joined to the dovetail 38. Optionally, a number of internal passages extend through the interior of the airfoil 30, ending in openings 44 in the surface of the airfoil section 30. A flow of cooling air is directed through the internal passages, to remove heat from the airfoil section 30.

The shroud 26 and the turbine blade 20/disk structure are initially dimensioned so that the inner diameter of the shroud 26 is slightly smaller than the locus of points swept by the tip 34 as it rotates at the service temperature for at least one point around the circumference of the shroud. When the gas turbine engine is first started and is in its break-in period, the tip 34 intentionally rubs against the shroud 26, wearing away a circumferential track in the shroud 26. This arrangement aids in dynamically sealing the tunnel 28 of the gas flow path against leakage of the hot combustion gas around the turbine blades 20, by cutting a groove in the shroud rather than wearing away the blade tips.

A coating is used on the turbine blade 20 to ensure that the blade tip 34 wears away the shroud 26, rather than vice versa. In an approach discussed herein, an abrasive coating is applied to the tip 34, and a protective coating is applied to at least a portion of the airfoil 30.

Figure 3:
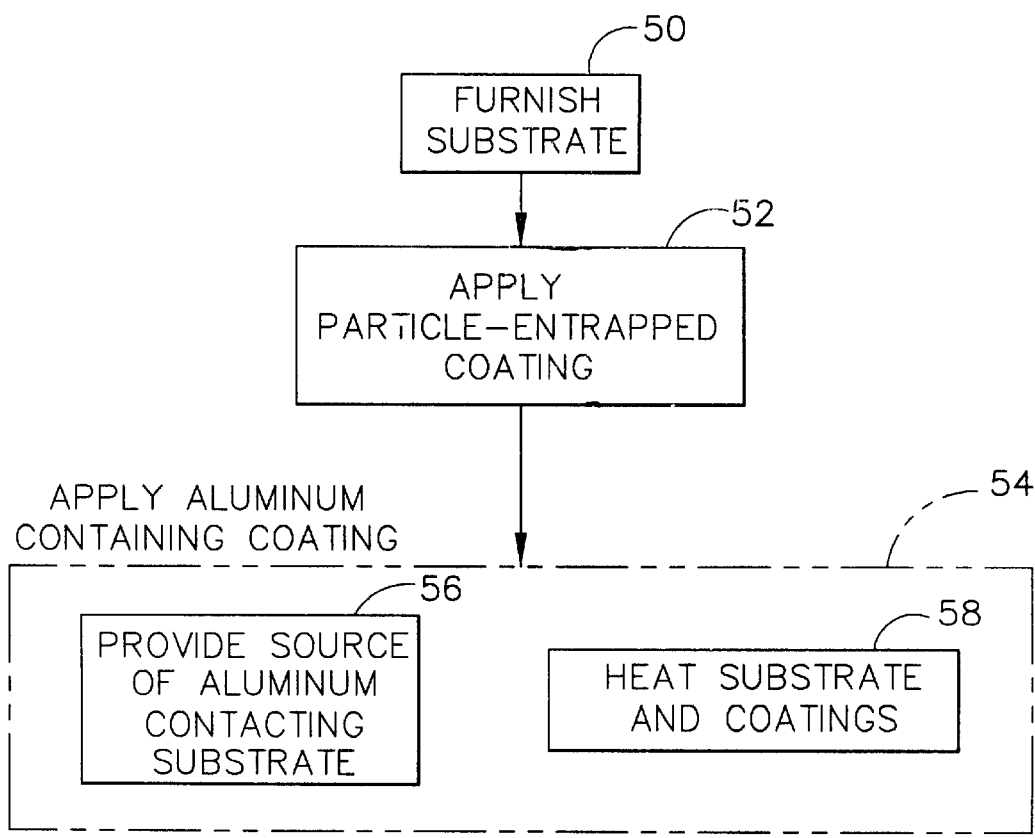
FIG. 3 is a block diagram of an approach for practicing the present invention.
Figure 4:
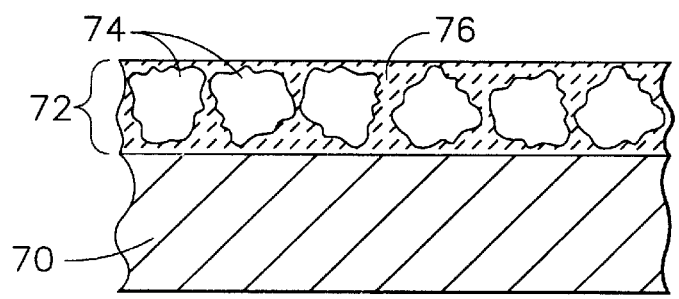
FIG. 4 is an idealized representation of a microstructure of an as-applied particle-entrapped coating.
Figure 5:
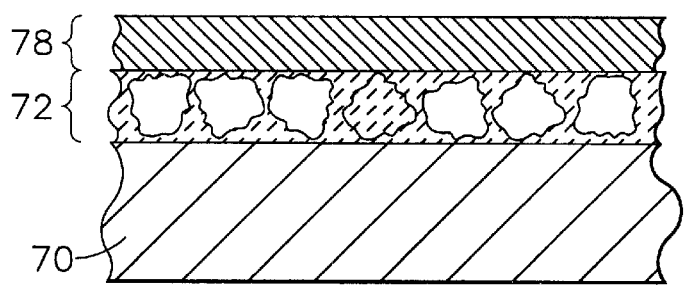
FIG. 5 is an idealized representation of a microstructure of a particle-entrapped coating with an aluminum-containing coating deposited thereon, prior to complete interdiffusion.
Figure 6:
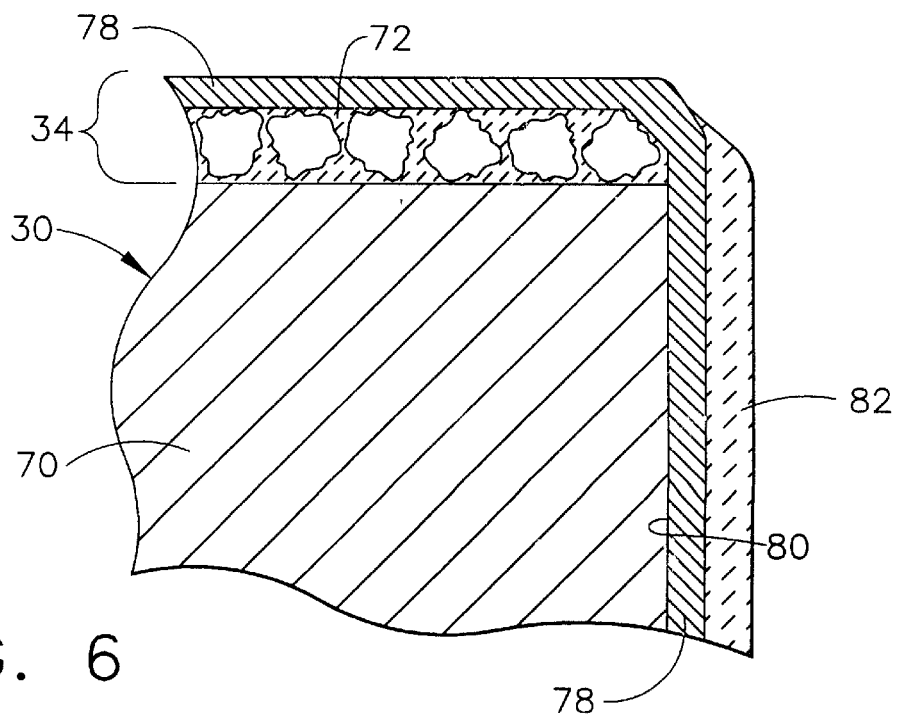
FIG. 6 is an idealized representation of the structure of a coated turbine blade.

FIG. 3 depicts a preferred approach for coating an article, in this case the turbine blade 20. FIGS. 4–6 illustrate the article at various locations and stages of the coating process. A substrate 70 is furnished, numeral 50. In the preferred case, the substrate 70 is the turbine blade 20. The turbine blade 20 is typically made of a nickel-base superalloy. A typical nickel-base alloy has a composition, in weight percent, of from about 1 to about 25 percent cobalt, from about 1 to about 25 percent chromium, from about 0 to about 8 percent aluminum, from 0 to about 10 percent molybdenum, from about 0 to about 12 percent tungsten, from about 0 to about 12 percent tantalum, from 0 to about 5 percent titanium, from 0 to about 7 percent rhenium, from 0 to about 6 percent ruthenium, from 0 to about 4 percent niobium, from 0 to about 0.2 percent carbon, from 0 to about 0.15 percent boron, from 0 to about 0.05 percent yttrium, from 0 to about 1.6 percent hafnium, balance nickel and incidental impurities. Specific compositions are known in the art. The turbine blade 20 may be made by any operable approach, but it is typically made by casting with an equiaxed-grain structure, a directionally oriented polycrystalline structure, or a single-crystal grain structure. Techniques for the casting of such structures are known in the art.

A particle-entrapped coating 72 is applied to at least a portion of the substrate 70, numeral 52. In the preferred case, the particle-entrapped coating 72 is applied to the tip 34 of the turbine blade 20 and in part forms the tip 34 of the turbine blade. As seen in FIG. 4, the particle-entrapped coating 72 is formed of particles 74 entrapped within and encapsulated by a matrix 76. Particles 74 of any operable type and size may be used. In a preferred case, the particles 74 are boron nitride particles, most preferably cubic boron nitride particles, having a nominal particle size of about 0.0054 inches diameter. The matrix 76 may be of any operable type and composition. In a preferred case, the matrix is nickel (which may be pure nickel or a nickel-base alloy). The particle-entrapped coating 72 typically comprises from about 66 to nearly 100 percent by volume of the particles 74, with the remainder the matrix 76. The particle-entrapped coating 72 may be of any operable thickness. In the case of a particle-entrapped tip coating on the tip 34 of a gas turbine blade 20, the coating 72 is preferably from about 0.005 inch to about 0.008 inch thick. Thus, as illustrated, the diameters of the particles are about the same as the coating thickness, so that the particles may either protrude slightly from the coating surface or may be slightly below the coating surface.

The particle-entrapped coating 72 may be applied by any operable process. In a preferred case, the particle-entrapped coating 72 is applied by electrodeposition. Techniques for the application of particle-entrapped coatings by electrodeposition are known in the art. For example, the particle-entrapped boron nitride/nickel coating may be applied by first acid etching the area to be coated in 5 percent hydrochloric acid solution and then acid activating the area by dipping it into a nickel chloride solution. A plating bath is a nickel sulfamate solution with boron nitride (preferably cubic boron nitride) particles mixed therein. The area to be coated is immersed into the plating bath with the surface to be coated facing upwardly. Nickel is plated from the bath at a current of 5–20 amperes for 30–60 minutes, with agitation of the bath to prevent the particles from settling. The agitation is stopped for 10–30 minutes with the current applied, so that the particles onto the surface as the plating of nickel continues. Agitation is resumed for 5–10 minutes with the current applied, so that nickel is electrodeposited overlying the particles without allowing additional particles to settle to the surface.

An aluminum-containing coating 78 is applied, numeral 54. In the case of the turbine blade 20, the aluminum-containing coating 78 is applied over the particle-entrapped coating 72, as seen in FIGS. 5–6. The aluminum-containing coating 78 is also preferably applied over at least some of the surfaces of the airfoil 30 to which the particle-entrapped coating 72 is not applied, specifically at least some of the lateral surfaces 80 of the airfoil 30.

The particle-entrapped coating 72 applied in step 52 is not substantially interdiffused with the substrate 70, in a separate step, prior to the application of the alumninum-containing coating 78 in step 54.

The aluminum-containing coating 78 is applied by any operable process operating at an elevated coating temperature and which otherwise meets the limitations of the present approach. A preferred coating process, vapor-phase aluminiding or VPA, is depicted by the substeps within step 54 of FIG. 3. A gaseous source of aluminum is contacted to the substrate 70, numeral 56. The preferred gaseous source is aluminum fluoride ($AlF_3$) gas produced from solid aluminum fluoride. The decomposition of the aluminum fluoride gas and the deposition of aluminum onto exposed surfaces occurs at the coating temperature. The coating temperature is greater than about 1800° F., preferably from about 1800° F. to about 2000° F., and most preferably from about 1925° F. to about 1975° F. The substrate 70 and the previously deposited particle-entrapped coating 72 are therefore heated to this temperature range, numeral 58, to accomplish the deposition. The heating is performed in a coating chamber, and a time of approximately 1 hour is required to heat the substrate 70 and the previously deposited particle-entrapped coating 72 to the coating temperature. An aluminum-containing coating 78 from about 0.001 inch to about 0.003 inch thick may be applied in a period of from about 4 hours to about 7 hours at the coating temperature. FIGS. 5–6 show the coatings 72 and 78 as distinct layers for clarity, but as time proceeds at the coating temperature and subsequently in service, the coatings 72 and 78 interdiffuse with each other and with the substrate 70, so that their demarcations become less distinct over time.

A platinum layer may optionally be electrodeposited after step 52 but before the aluminum-containing coating is deposited and interdiffused in step 54. The result is a platinum aluminide coating rather than a simple diffusion aluminide coating.

As the substrate 70 and the previously deposited particle-entrapped coating 72 are heated to the coating temperature, they pass through the lower temperature ranges. As they are heated through the temperature range of from about 1600° F. to about 1800° F., the matrix 76 of the particle-entrapped coating 72 interdiffuses a small amount with the material of the substrate 70. This small amount of interdiffusion bonds the particle-entrapped coating 72 to the substrate 70 sufficiently that the particle-entrapped coating 72 does not spall away from the substrate 70 during the remainder of the application step 54.

The aluminum-containing coating 78 deposits overlying the previously deposited particle-entrapped coating 72, in the regions where the coating 72 is present, as seen in FIGS. 5–6. During the period that the substrate 70 and the coatings 72 and 78 are at elevated temperature, the constituent elements of the coatings 72 and 78 interdiffuse with each other and with the substrate 70. The diffusing aluminum from the coating 78 chemically interacts with the previously deposited particles 74 of the particle-entrapped coating 72. In the case of the preferred boron nitride particles 74, the aluminum, boron, and nitrogen react with the nickel of the matrix 76 to form any of several compounds that contribute to the hardness, abrasiveness, strength, oxidation resistance, and longevity of the particle-entrapped coating 72. Generally, these compounds involve the formation of electrostatic and covalent bonding linkages between boron atoms and possibly nitrogen atoms. Preferably but not necessarily, the morphology of the structure is a layered boron nitride matrix with the aluminum atoms coordinated by the boron nitride. The layers are linked at their vertices. Examples of such compounds include complex Al-B-N compounds, complex Ni-Al-B-N compounds, $AlB_2$, $AlB_x$, and AlBN.

This altered morphology is not present if there is a substantial prior interdiffusing of the particle-entrapped coating with the substrate as a separate step following step 52 and before step 54. In such an approach, there is insufficient time and an absence of the necessary elements for the linking mechanism to occur.

After the step 54 is completed, a ceramic thermal-barrier coating 82 may be applied overlying the portion of the aluminum-containing layer that does not in turn overlie the particle-entrapped coating 72. The ceramic coating 82 is preferably yttria-stabilized zirconia, which is zirconium oxide containing from about 2 to about 12 weight percent, preferably from about 3 to about 8 weight percent, of yttrium oxide. The ceramic coating 82 is typically from about 0.003 to about 0.010 inch thick. Other operable ceramic materials and thicknesses may be used as well. The ceramic coating 82, when used, is deposited by any operable approach, with physical vapor deposition and powder spray being preferred.

The present invention has been reduced to practice, and its results compared with those of the conventional approach wherein the nickel/boron nitride particle-entrapped layer is deposited and diffused, and then the aluminum-containing coating is deposited and diffused. In the conventional approach, a substantial number of the boron nitride particles are removed from the surface during handling and machining, as they are not well bonded to the matrix. The partially particle-depleted surface is consequently less effective during the initial break-in period of the gas turbine engine to wear away the shroud material. In the present approach, by contrast, the boron nitride particles are not lost to any substantial degree during handling and machining. Consequently, the boron nitride particles remain present during the break-in period of the gas turbine engine, and are effective at wearing a track in the shroud. It is believed that the change in crystallographic structure of the particles discussed earlier is important in achieving this improvement to the bonding and the performance of the particle-entrapped coating.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method for coating an article, comprising the steps of:

furnishing an article substrate; thereafter applying a particle-entrapped coating to the article substrate; and thereafter applying an aluminum-containing coating overlying the particle-entrapped coating, the step of applying the aluminum-containing coating including the steps of providing a source of aluminum contacting the particle-entrapped coating that deposits aluminum onto the particle-entrapped coating at a coating temperature, and heating the article substrate to the coating temperature so that the aluminum-containing coating is deposited onto the particle-entrapped coating, and the aluminum-containing coating and the particle-entrapped coating are diffused into the article substrate, the step of applying the alumninum-containing coating to occur without substantial prior interdiffusing of the particle-entrapped coating with the article substrate as a separate step.

2. The method of claim 1, wherein the step of applying a particle-entrapped coating includes the step of applying a coating comprising boron nitride particles embedded in a matrix comprising nickel.

3. The method of claim 1, wherein the step of providing a source of aluminum includes the step of providing a gaseous source of aluminum.

4. The method of claim 1, wherein the step of providing a source of aluminum includes the step of providing a gaseous source of aluminum comprising $AlF_3$.

5. The method of claim 1, wherein the coating temperature is from about 1800° F. to about 2000° F.

6. The method of claim 1, wherein the article substrate is a tip of a gas turbine blade.

7. A method for coating an article substrate, comprising the steps of:

furnishing an article substrate having a first region and a second region; thereafter applying a particle-entrapped coating to the first region; and thereafter applying an aluminum-containing coating to the first region and to the second region, the step of applying the aluminum-containing coating including the steps of providing a source of aluminum contacting the first region and the second region that deposits aluminum onto the first region and onto the second region at a coating temperature, and heating the article substrate to the coating temperature so that the aluminum-containing coating is deposited onto the first region and onto the second region, and so that the aluminum-containing coating and the particle-entrapped coating are diffused into the article substrate, the step of applying the aluminum-containing coating to occur without substantial prior interdiffusing of the particle-entrapped coating with the first region as a separate step.

8. The method of claim 7, wherein the step of applying a particle-entrapped coating includes the step of applying a coating comprising boron nitride particles embedded in a matrix comprising nickel.

9. The method of claim 7, wherein the step of providing a source of aluminum includes the step of providing a gaseous source of aluminum.

10. The method of claim 7, wherein the step of providing a source of aluminum includes the step of providing a gaseous source of aluminum comprising $AlF_3$.

11. The method of claim 7, wherein the coating temperature is from about 1800° F. to about 2000° F.

12. The method of claim 7, wherein the article substrate is a tip of a gas turbine blade.

13. A method for coating a turbine blade, comprising the steps of:

furnishing a turbine blade substrate having an airfoil and a tip at an end of the airfoil; thereafter applying a particle-entrapped tip coating to the tip of the airfoil; and thereafter applying an aluminum-containing coating to the airfoil and to the tip of die airfoil overlying the particle-entrapped tip coating, the step of applying the aluminum-containing coating including the steps of providing a source of aluminum contacting the airfoil and the tip of the airfoil that deposits aluminum onto the airfoil and onto the tip of the airfoil at a coating temperature, and heating the airfoil and the tip of the airfoil to the coating temperature so that the aluminum-containing coating is deposited onto the airfoil and onto the tip of the airfoil, and so that the aluminum-containing coating and the particle-entrapped tip coating are diffused into the turbine blade substrate, the step of applying the aluminum-containing coating to occur without substantial prior interdiffusing of the particle-entrapped tip coating with the tip of the airfoil as a separate step.

14. The method of claim 13, wherein the step of applying a particle-entrapped tip coating includes the step of applying a tip coating comprising boron nitride particles embedded in a matrix comprising nickel.

15. The method of claim 13, wherein the step of providing a source of aluminum includes the step of providing a gaseous source of aluminum.

16. The method of claim 13, wherein the step of providing a source of aluminum includes the step of providing a gaseous source of aluminum comprising $AlF_3$.

17. The method of claim 13, wherein the coating temperature is from about 1800° F. to about 2000° F.

* * * * *